United States Patent Office 3,458,593
Patented July 29, 1969

3,458,593
MANUFACTURE OF n-ALKENE FROM n-ALKANE
Charles A. Senn III, Nederland, and Levi C. Parker, Port Arthur, Tex., assignors to Texaco Inc., New York, N.Y., a corporation of Delaware
No Drawing. Filed Dec. 12, 1967, Ser. No. 689,811
Int. Cl. C07c 5/18; B01j 11/46
U.S. Cl. 260—683.3                    2 Claims

ABSTRACT OF THE DISCLOSURE

A method of preparing n-mono-olefins from n-paraffins by contacting n-paraffins with a crystalline metallic alumino-silicate molecular sieve of a uniform pore size of about 10 angstrom units having impregnated thereon between about 0.1 and 5 wt. percent of a platinum metal.

BACKGROUND OF INVENTION

Field of the invention

The field of art to which this invention pertains is the conversion of hydrocarbons to olefins particularly wherein saturated hydrocarbons are dehydrogenated to form olefins.

Description of the prior art

In the past olefins have been prepared from hydrocarbons by a variety of methods. One means utilized in the art is exemplified by U.S. 3,151,180 wherein corresponding olefins are manufactured from $C_6$ to $C_{20}$ paraffins by contacting said paraffins with a catalyst consisting of a specific alumina impregnated with a platinum metal under particular temperature and pressure and liquid space velocity conditions. The alumina carrier is taught to be critical in repressing the formation of aromatics. Although processes such as these do produce olefins, they do have the drawback of encouraging the production of a substantial amount of cracked product. To counteract the cracking tendency of platinum on alumina, processes have been developed such as U.S. 3,293,319 which poison standard platinum-alumina dehydrogenation catalyst with a combination of lithium and a material such as arsenic, antimony or bismuth. These poisons substantially suppress cracking of the saturated hydrocarbons, and also reduce isomerization reactions, thereby forming a substantial amount of corresponding olefins.

Hereinbefore and hereinafter by the term "corresponding olefin," or "corresponding alkene," it is intended to denote an n-olefin or n-alkene of the same chain length as the n-paraffin from which it is derived.

SUMMARY OF INVENTION

We have discovered, and this constitutes our invention, a novel catalytic method of converting straight chain n-paraffins (n-alkanes) to corresponding n-mono-olefins (n-alkenes), in the substantial absence of skeletal isomerization and the formation of undesired aromatic and cracked by-products. Further, we have discovered a method where high conversions to corresponding n-alkene can be obtained at temperatures which promote a rapid rate of reaction, yet result in a yield of corresponding n-alkene substantially over 80% of the total conversion product.

Specifically, the method of the invention comprises contacting an n-alkene of from 6 to 20 carbons with a crystalline metallic alumino-silicate zeolitic sieve of a uniform pore size of about 10 angstroms having impregnated thereon between about 0.1 and 5 wt. percent of a platinum metal under particular temperature, pressure and liquid space velocity conditions.

DETAILED DESCRIPTION OF THE INVENTION

In detail, the method of the invention comprises contacting a straight chain paraffin of from 6 to 20 carbons with a crystalline metallic alumino-silicate sieve of a pore opening size of about 10 angstroms and having impregnated thereon between about 0.1 and 5 wt. percent preferably between about 0.5 and 1 wt. percent, of a platinum metal selected from the group consisting of platinum, palladium, ruthenium and rhodium at a temperature between about 800 and 950° F., preferably between about 850 and 910° F., under a pressure of between about 0 and 220 p.s.i.g., preferably between about 10 and 60 p.s.i.g., utilizing a liquid space velocity of between about 0.5 and 10 LHSV (volumes reactant/hour/volume catalyst), preferably between about 2 and 6. Platinum is the preferred platinum metal. Optionally, the contacting is conducted in the presence of hydrogen feed utilizing a mole ratio of hydrogen to alkane reactant of between about 0.5:1 and 15:1. The function of the hydrogen feed is to prolong catalyst life by retarding the formation of any carbonaceous deposits on the sieve base material. The hydrogen further functions to reduce any platinum metal compounds impregnated on the sieve to the metal state.

The method is normally conducted in the vapor phase with the mono-olefin products being recovered from the reactor effluent by standard means such as selective extraction with solvents such as with furfural or $SO_2$, selective extraction distillation, azeotropic distillation, molecular sieve adsorption, or chromatographic separation.

The reaction may be conducted in any standard type of vapor phase reactor which is packed with the catalytic material. In small scale production, the reactor might be surrounded by a heating mechanism to maintain the reactor at the desired temperature. In large scale operations, the charge to the reaction (hydrocarbons plus hydrogen) would be heated to the desired temperature prior to entering the reactor. Since the reaction is endothermic, two or more reactors might be used in series, with reheat provided therebetween.

Examples of the n-paraffin hydrocarbon reactant contemplated herein are n-hexane, n-octane, n-decane, n-undecane, n-dodecane, n-tridecane, n-tetradecane, n-hexadecane, n-octadecane and n-eicosane and mixtures thereof. The n-alkenes resulting from the aforelisted n-paraffins are n-hexene, n-octene, n-decene, n-undecene, n-dodecene, n-tridecene, n-tetradecene, n-hexadecene, n-octadecene, and n-eicosene, and mixtures thereof respectively.

The molecular sieve base of the contemplated catalyst is often designated in the scientific and patent literature as a 13X sieve. The 13X sieve may be either a synthetic or natural zeolite of about a 10 angstrom pore size. The synthesis and detailed characterization of the X-type sieve is found in U.S. 2,882,244 and U.S. 3,311,190. In brief, the X-type sieve may be characterized by the general formula:

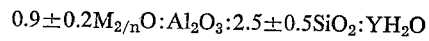

$$0.9 \pm 0.2 M_{2/n}O : Al_2O_3 : 2.5 \pm 0.5 SiO_2 : YH_2O$$

where M is a metal, $n$ is its valence and Y ranges from about 6 up to 8 depending on the identity of the metal and the degree of crystal hydration.

Specifically, the molecular sieve base suitable for use in the process of the invention is available commercially and may be produced in a number of ways. The sodium alumino-silicate X molecular sieve (13X) of a pore size of about 10 Angstroms may be conveniently prepared by mixing the following reaction mole amounts in an aqueous solution held at 100° C.:

| | |
|---|---|
| $SiO_2/Al_2O_3$ | 3–5:1 |
| $Na_2O/SiO_2$ | 1.2–1.5:1 |
| $H_2O/Na_2O$ | 35–60:1 |

These reactants are mixed usually in the form of sodium silicate, sodium aluminate and water in a manner to produce a precipitate having a uniform composition. A preferred method for combining them is to add sodium aluminate to sodium silicate to which may be added sodium hydroxide at ambient temperatures using rapid and efficient agitation to produce a homogeneous mixture. The mixture is then heated to a temperature of from about 180° F. to about 210° F. and held at that temperature for a period of from about 0.5 to about 3 hours or longer. The crystals may be formed at lower temperatures but in that case longer reaction periods are required. At temperatures above about 250° F. a crystalline composition having a requisite uniform pore size opening is not obtained. During crystallization the pH of the solution should be maintained on the alkaline side, i.e., at about 12 or higher. This is accomplished using a strong base such as sodium hydroxide during crystallization if needed to maintain the desired pH. At lower pH levels crystals having the desired uniform properties are not as readily formed.

The crystals thus prepared are in a finely divided state and are usually pelleted with a suitable binder material before they are calcined in order to activate them; however, use of a binder material is optional and not mandatory. Any of a number of binder agents used in the manufacture of catalyst may be employed for this purpose. A binder consisting of bentonite, sodium silicate and water, for example, has been found satisfactory. In using this binder the constituents should be mixed so that the product contains from about 5 to about 10 wt. percent bentonite, 5 to 15 wt. percent sodium silicate and 75 to 90 wt. percent of the crystals on a dry basis; the total mixture containing about 25% to 35% water. This mixture then may be extruded into pellets such as cylindrical pellets of between about 1/32 and 1/4 inch diameter and between about 1/32 and 1/4 inch length or otherwise shaped and subsequently dried and calcined. Calcination temperatures of from about 700 to about 900° F. or higher are satisfactory.

The thus prepared molecular sieve is impregnated by any one of a number of means. One such means calls for contacting the sieve with an aqueous or organic solution of the soluble metal compound such as chloroplatinic acid, platinum diamino dinitrite, palladium chloride, etc. under conditions of agitation and at ambient temperatures to insure uniform wetting, and then raising the temperature to approximately between about 100 and 200° F. for a period of time such as a half hour. The thus wetted catalyst is then removed from the solution and dried under preferably rising temperature conditions at a temperature, e.g., between about 180 and 900° F. for a period of time, e.g., between about 5 and 30 hours. As a result of this impregnation and heating, the platinum metal coats the molecular sieve including the interior of the sieve cages at least partially in the form of an oxide, this oxide being apparently developed during the calcining operation. The reduction of the platinum compound (oxide or otherwise) coating on the molecular sieve may be accomplished by contacting the metallized sieve after calcining with hydrogen at a temperature between about 500 and 1000° F. for a period of time, e.g., between about 3 and 24 hours under hydrogen pressure of between about 0 and 500 p.s.i.g. Further, when hydrogen is employed in reactant feed during dehydrogenation, reduction also takes place.

After operation as a dehydrogenation catalyst for a period of time, the catalyst loses some of its activity but may be regenerated by the following technique, namely, first purging the catalytic sieve with an inert gas, e.g., 60–70 cubic feet per hour of nitrogen per liter of catalyst while bringing the catalyst to an elevated temperature for a period of time, e.g., about 5 to 20 hours to crack off hydrocarbon and convert the deposits to coke, then introducing air into the nitrogen stream at an initial concentration of less than 1 volume percent, e.g., 0.2 volume percent and increasing the air content in the nitrogen stream as necessary to maintain a burn wave in the reactor without exceeding 950° F. maximum temperature. After the burn wave has passed through the catalyst bed, the reactor is then purged with nitrogen.

It is to be noted the excellent results obtained from the use of a platinumized 13X molecular sieve is surprising in view of the teachings of the art such as U.S. 3,247,099 which describes the platinumized X sieve as an excellent reforming catalyst. We have unexpectedly found that when in combination with a platinum metal in the method of our invention, the metallized 13X sieve does not exhibit reforming properties but surprisingly dehydrogenates the n-paraffin to the corresponding n-alkene with very little cracking, aromatization, isomerization and other reforming and hydroforming type reactions.

The following examples further illustrate the invention but are not to be construed as limitations thereof.

Example I

This example illustrates the preparation of the catalyst.

To a 250 cc. graduate there was sequentially added 50 ccs. of distilled water and 1.4 grams of chloroplatinic acid ($H_2PtCl_6 \cdot 6H_2O$). To the graduate there was then added via slow pouring 50 grams of 1/16" extrudates of a Linde 13X molecular sieve (which had previously been dried at 900° F.). This molecular sieve has a uniform port diameter of 10 Angstrom units and the formula:

$$0.83 \pm 0.05 Na_2O : 1.00 Al_2O_3 : 2.48 \pm 0.03 SiO_2 : 6.1 H_2O$$

Since the combination causes an exothermic reaction, the rate of pouring was adjusted to maintain the gas displacement and boiling under sufficient control to prevent loss of the catalyst and platinumizing material. At the end of the introduction of the 13X molecular sieve the graduate was stoppered and tumbled for a period of 5–10 minutes to insure uniform wetting. The catalyst was then allowed to stand in contact with the platinumizing solution for 12 hours at ambient conditions and the graduate containing the 13X molecular sieve catalyst and platinum solution was tumbled intermittently to insure constant uniform wetting. The platinumized sieve was then separated from the liquid and placed in a drying dish and dried at 250° F. for 4 hours and calcined at 900° F. for 6 hours. At the end of the calcining period the platinumized catalyst was cooled in a desiccator and stored in an air free container. A sample of the catalyst was analyzed and found to be a 13X sieve having impregnated thereon 0.9 wt. percent platinum.

Example II

This example illustrates a somewhat different method of preparation of a larger quantity of the catalyst.

Forty grams of chloroplatinic acid ($H_2PtCl \cdot 6H_2O$) were added to 2000 ml. distilled water. 500 ml. of this solution were added to each of four 1000 ml. graduates. To each graduate were added via slow pouring 500 grams of 1/16" extrudates of the aforedescribed Linde 13X molecular sieve, which had been previously dried at 900° F. This mixture was shaken thoroughly for several minutes, then placed in an oven held at 150° F. for 1½ hours. Following this, 580 mls. of excess solution were poured off. The catalyst (3050 mls.) was dried overnight in an oven held at 200° F. A 2800 ml. portion was then dried in an oven held at 300° F. for 4 hours. The 580 mls. of excess solution was diluted to 1000 mls. with distilled water. This 1000 ml. solution was added to the 2800 mls. of catalyst dried at 300° F., and the mixture was shaken thoroughly for several minutes, following which, approximately 100 mls. of excess solution was poured off and discarded. The catalyst was then dried sequentially for 65 hours at 200° F., 4 hours at 300° F., 1 hour at 500° F., 1 hour at 700° F., and 4 hours at 900° F. At the end of the drying period the platinumized catalyst was cooled in a desiccator and stored in an air-free container. Analysis of the catalyst showed a platinum content of 0.73 wt. percent.

Example III

This example illustrates the method of the invention and the criticality of the catalytic agent employed therein in producing corresponding n-alkenes from n-alkanes with substantially no undesired cyclized, isomerized and/or cracked by-products.

The catalyst employed in the method of the invention was of the type prepared in Example I (Catalyst A) and Example II (Catalyst B).

In the comparative runs the following catalysts were employed:

Catalyst C: Platinum on sodium Y molecular sieve wherein the Y sieve was a sodium alumino silicate molecular sieve having an average pore diameter of 10 Angstroms and of the formula:

$$X'Na_2O:Al_2O_3:Y'SiO_2:Z'H_2O$$

where $X'$, $Y'$ and $Z'$ are respectively $0.9 \pm 0.2$, 3–6 and $<$ about 9. The Y sieves are more fully described in U.S. 3,130,007 and U.S. 3,331,190. The Y sieve (Linde SK40) employed was a $\frac{1}{16}''$ extrudate and the impregnated platinum catalyst therefrom was prepared by dissolving 2 grams of $H_2PtCl_6 \cdot 6H_2O$ in 100 ccs. of water and placing said chloroplatinic solution in a stoppered graduate and slowly introducing 100 grams of the Y molecular sieve in the solution, the rate of introduction being tailored to prevent the loss of materials through boiling. The graduate was then stoppered and shaken for several minutes to insure uniform wetting. The excess solution was then poured off and the catalyst was dried successively at 150° F. for 2 hours, 180° F. for 4 hours, 200° F. for 4 hours, 250° F. for 4 hours, 500° F. for 2 hours and then calcined at 900° F. for 4 hours. The test results on the catalyst showed that it contained 0.68 wt. percent platinum.

Catalyst D: A platinum on a gamma alumina base in the form of $\frac{1}{16}''$ spheres having a platinum content of 0.72 wt. percent, a fluorine content of about 0.35 wt. percent and chlorine content of about 0.35 wt. percent was impregnated with 0.5 wt. percent lithium and 0.37 mole arsenic per mole of platinum. This catalyst is of the general type described in U.S. 3,293,319. The lithium and arsenic free platinum on alumina base catalyst is sold by Universal Oil Products Co. under the trade name R-8 Platinum Reforming Catalyst.

The n-paraffin reactant employed in Run A was essentially n-decane, in Runs B and C a 50:50 mix of n-dodecane and n-tridecane, and in Run D it was essentially n-dodecane. These charge stocks were selected on the basis of their availability at the time of the experiments. The differences in charge stock composition would have no appreciable effect upon the performance of the catalyst. These stocks approximated 99 wt. percent n-paraffin purity. The non-normals were 1.0 wt. percent or less, and aromatic content was less than 0.1 wt. percent.

In the dehydrogenation operation the n-paraffin charge stock was pumped from a charge graduate through a line into which hydrogen was introduced and the resultant mixture was introduced into a preheater section prior to entering the reactor. The preheater and reactor were surrounded by a fluidized bed of silica alumina heat transfer agent which in turn was surrounded by a shell container, having heating elements in combination therewith. The reaction mixture was preheated to the desired temperature during its passage through approximately 60 inches of $\frac{1}{4}$ inch stainless steel pipe located in the fluidized bed. The mixture was passed into the reactor (approximately 16 inch length of 1″ stainless steel pipe) housing from 100 to 200 ccs. of catalyst. The product was withdrawn from the reactor and passed to a cooler maintained at 50° F. and the gases were separated from the resultant condensate. The condensate was then passed on to a fractionator maintained at 250° F. to remove gases overhead and the liquid below was recovered as n-paraffin-n-olefin product. The recovered liquid was then analyzed via liquid and gas chromatography. The test data and results are reported below in Table I.

TABLE I

|  | Run |  |  |  |
|---|---|---|---|---|
|  | A | B | C | D |
| Reactants: |  |  |  |  |
| Catalyst | (1) | (2) | (3) | (4) |
| n-Paraffin | $C_{10}$ | $C_{12}$–$C_{13}$ | $C_{12}$–$C_{13}$ | $C_{12}$ |
| Mole $H_2$/mole hydrocarbon | 5.5 | 8.1 | 7.8 | 7.8 |
| Reaction conditions: |  |  |  |  |
| Temp., °F | 860 | 860 | 860 | 850 |
| Pressure, p.s.i.g. | 15 | 15 | 15 | 15 |
| Space velocity, $V_p/V_c$/hr.[5] | 2 | 2 | 2 | 2 |
| Hydrocarbon res. time, secs. | 1.22 | 1.17 | 1.22 | 1.18 |
| Hours on stream | 47–48 | 24–36 | 37–48 | 11–12 |
| Average product yield: |  |  |  |  |
| Charge n-alkane, wt. percent | 83.6 | 83.8 | 84.9 | 84.3 |
| "Corresponding" n-alkene, wt. percent | 12.9 | 13.3 | 10.6 | 12.1 |
| Cracked product, wt. percent | 0.2 | 0.7 | 1.3 | Trace |
| Isomers and cyclics, wt. percent | 3.3 | 2.2 | 3.2 | 3.6 |
| Selectivity, mole percent[6] | 79.8 | 83.2 | 70.6 | 78.2 |
| Conversion per pass, wt. percent | 16.4 | 16.2 | 15.1 | 15.7 |

[1] 0.9% Pt, 13X.
[2] 0.73% Pt, 13X.
[3] 0.68% Pt, NaY.
[4] 0.72 wt. percent Pt Li-As on Alumina.
[5] Space velocity in terms of liquid volumes of n-paraffin reactant $(V_p)$/solid volume of catalyst $(V_c)$/hour.
[6] Mole percent "corresponding" n-alkene of total converted product.

As can be seen from the foregoing, Runs A and B, representative of the method of this invention, have a higher selectively and per pass conversion than comparative Runs C and D.

Example IV

This example further illustrates the invention. The catalyst employed was that prepared in Example II. The n-paraffin reactant used was an n-$C_{12}$–$C_{13}$ mixture (also charge stock to Runs B and C, Example III) approximating 50% of each hydrocarbon. The reactor and operating procedure used were the same as those detailed in Example III. The test data shown in Table II below illustrate the results that were obtained with this catalyst when operating at temperatures, pressures and liquid hourly space velocities differing from those shown in Example III. The ranges shown are illustrative only and not limiting.

TABLE II

| | Run | | |
|---|---|---|---|
| | AA | BB | CC |
| Reactants: | | | |
| Catalyst | 0.75 wt. percent Pt on 13X | | |
| n-Paraffin | 50:50 mix n-$C_{12}$-$C_{13}$ | | |
| Mole $H_2$/mole hydrocarbon | 8.2 | 7.7 | 4.1 |
| Reaction conditions: | | | |
| Temp., °F | 880 | 910 | 876 |
| Pressure, p.s.i.g | 50 | 50 | 50 |
| Space velocity, $V_p/V_c$/hr | 4.0 | 4.0 | 8.0 |
| Hydrocarbon res. time, sec | 1.25 | 1.30 | 1.10 |
| Hours on stream | 60-72 | 276-288 | 37-48 |
| Average product yield: | | | |
| $C_{11}$-$C_{13}$ n-alkane, wt. percent | 87.0 | 86.9 | 88.9 |
| $C_{12}$-$C_{13}$ n-alkene, wt. percent | 10.4 | 10.2 | 9.1 |
| Cracked product, wt. percent | 1.2 | 1.4 | 0.9 |
| Isomers and cyclics, wt. percent | 1.4 | 1.5 | 1.1 |
| Selectivity,[1] mole percent | 80.6 | 78.6 | 83.3 |
| Conversion per pass, wt. percent | 13.0 | 13.1 | 11.1 |

[1] Mole percent n-$C_{11}$-$C_{13}$ alkene of total converted product.

We claim:
1. A method for converting an n-alkane of from 6 to 20 carbons to its corresponding n-alkene comprising contacting said alkane in admixture with hydrogen with a catalyst consisting of a crystalline metallic alumino-silicate molecular sieve of the general formula:

$$0.9 \pm 0.2 M_{2/n}O : Al_2O_3 : 2.5 \pm 0.5 SiO_2 : YH_2O$$

where M is a metal, n is its valence and Y ranges from about 6 up to 8 having uniform pore openings of about 10 Angstrom units, and having impregnated thereon between about 0.1 and 5 wt. percent of platinum metal selected from the group consisting of platinum, palladium, ruthenium and rhodium, said contacting being conducted at a temperature between about 800 and 950° F. utilizing an LHSV space velocity in the range of between about 0.5 and 10 under a pressure of between about 0 and 200 p.s.i.g. and employing a mole ratio of hydrogen to paraffin in the range of between about 0.5:1 and 15:1.

2. A method in accordance with claim 1 wherein said n-paraffin is selected from the group consisting of decane and a mixture of dodecane and tridecane, said molecular sieve is characterized by the formula:

$$0.83 \pm 0.05 Na_2O : 1.00 Al_2O_3 : 2.48 \pm 0.03 SiO_2 : XH_2O$$

where X is about 6 to 8 and said platinum metal is platinum.

References Cited

UNITED STATES PATENTS

| 3,140,252 | 7/1964 | Frilette et al. | 208—120 |
| 3,140,253 | 7/1964 | Plank et al. | 208—120 |
| 3,277,018 | 10/1966 | Plank et al. | 260—683.3 |
| 3,236,910 | 2/1966 | Bukata et al. | 260—683.3 |
| 3,293,319 | 12/1966 | Haensel et al. | 260—683.3 |
| 3,383,431 | 5/1968 | Fishel | 260—683.3 |

PAUL M. COUGHLAN, JR., Primary Examiner

G. E. COUGHLAN, JR., Assistant Examiner

U.S. Cl. X.R.

252—455